UNITED STATES PATENT OFFICE.

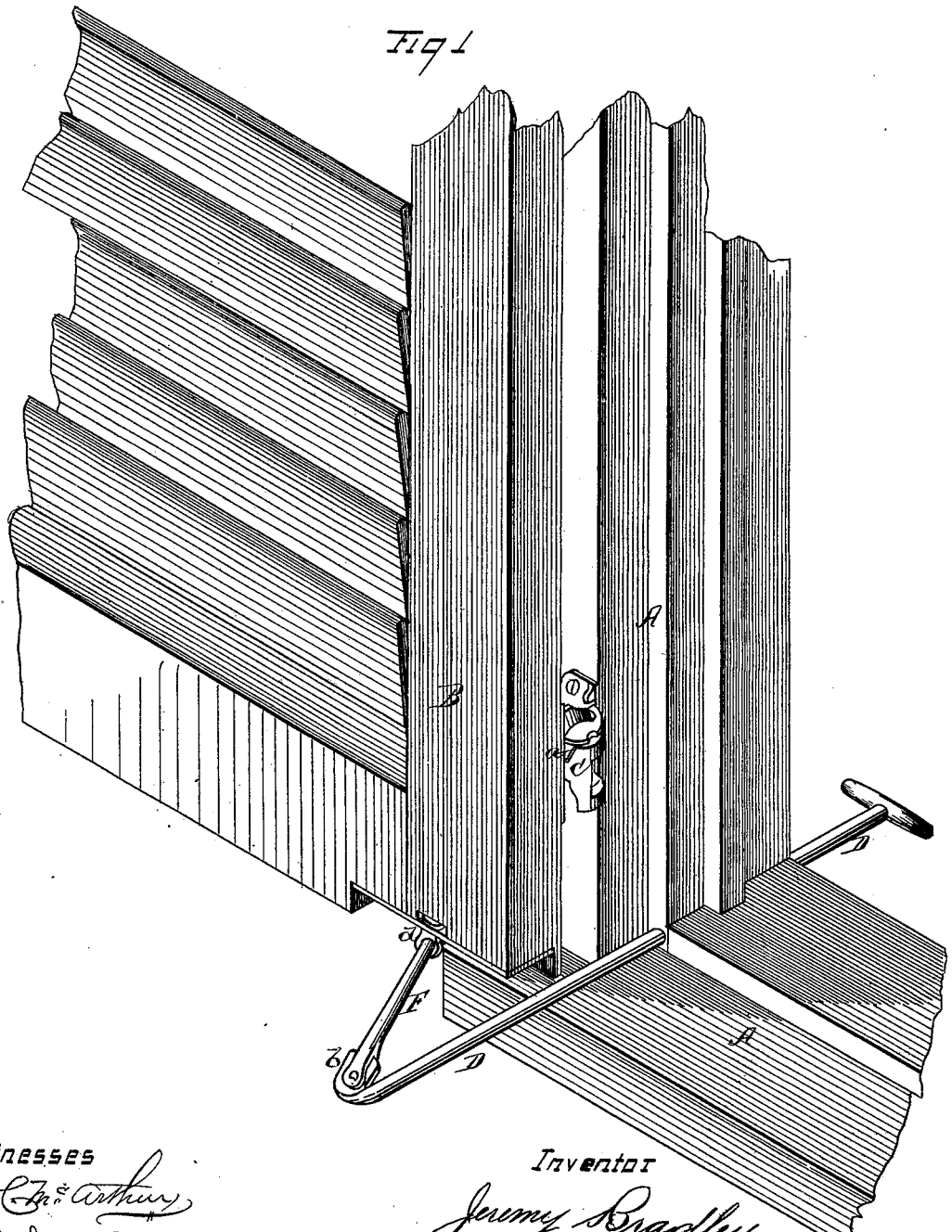

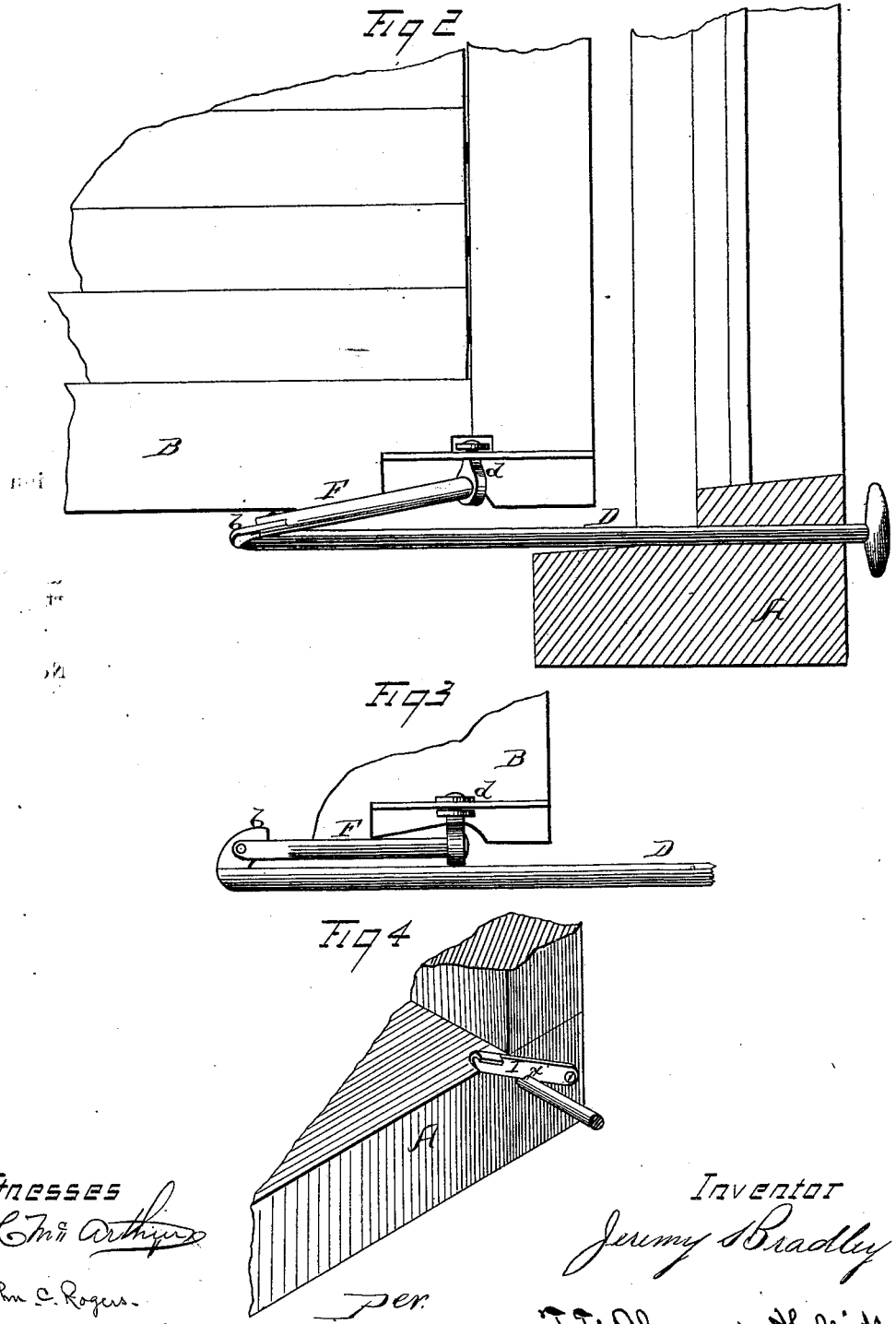

JEREMY BRADLEY, OF CEDAR FALLS, IOWA.

IMPROVEMENT IN WINDOW-BLIND OPENERS.

Specification forming part of Letters Patent No. 214,093, dated April 8, 1879; application filed February 11, 1879.

*To all whom it may concern:*

Be it known that I, JEREMY BRADLEY, of Cedar Falls, in the county of Black Hawk and State of Iowa, have invented certain new and useful Improvements in Window-Blind Openers; and I do hereby declare that the following is a full, clear, and exact description thereof, reference being had to the accompanying drawings, and to the letters of reference marked thereon, which form part of this specification.

The nature of my invention consists of the employment, in connection with the shutter, of a jointed lever, the inner end or short arm of which is attached to the shutter by means of a double swivel-joint, and arranged to operate substantially as herein set forth.

In order to enable others skilled in the art to which my invention appertains to make and use the same, I will now proceed to describe its construction and operation, referring to the annexed drawings, in which—

Figure 1 is a perspective view of a part of a window-frame and shutter with my invention applied thereto, and showing the shutter open. Fig. 2 is a transverse vertical section thereof, showing the shutter partly open. Figs. 3 and 4 are detailed views, showing parts of my invention.

A represents a part of a window-frame, with the shutter B connected thereto by hinges C. These hinges are preferably of the class which are provided with inclined projections and notches, as shown at *a*, to lock the shutter when opened.

The shutter-worker consists of a long lever, D, and a short lever, F, the long lever passing through the frame A to the inside, as shown, and the outer end of said long lever connected to one end of the short lever F by a flexible hook-joint, *b*. The other end of the short lever F is attached to the bottom edge of the shutter B by a double swivel-pivot joint *d*, by means of which the shutter is made to describe the semicircle necessary to open and close it when the power is properly applied to the other end of the long lever D. By means of the flexible hook-joint *b* the leverage is secured by which the shutter is lifted over the catch or stop at *a* in the shutter-hinge, and also for throwing the point of attachment to the shutter from one side of the long lever to the other.

When the shutter is closed it is locked by means of a catch, I, on the escutcheon being turned down into a notch, *x*, in the long lever D.

The operation of my invention is as follows: The long lever D, being provided at its  er end with a suitable handle, is pushed out slowly until the shutter is half open, when the two levers D and F will be approaching the same line and lie side by side. Then turn the long lever D in order to throw the short lever on the other side of the long one, and then pull on the long lever, when the shutter will be thrown completely open to place. Now, to close the shutter, grasp the handle of the long lever D and turn it slightly in a direction from the shutter to raise the same over the catch or stop at *a* in the shutter-hinge. The shutter being thus raised, push out the long lever D until the short lever F approaches the same line with the long one, when the long lever is to be turned in the opposite direction from that in opening to throw the short lever back to the other side of the long one, which being done a pull on the long lever will close the shutter to place.

Having thus fully described my invention, what I claim as new, and desire to secure by Letters Patent, is—

In a shutter-worker, the lever F projecting outward from the shutter and attached thereto by a double swivel-joint, in combination with lever D, to which its outer end is jointed, said lever D being adapted to pass through the casing into the room, and by a reciprocating and partially-rotary movement to throw lever F from one side to the other, and thereby open or close the shutter, substantially as described.

In testimony that I claim the foregoing as my own I affix my signature in presence of two witnesses.

JEREMY BRADLEY.

Witnesses:
WM. H. MCCLURE,
C. H. SHAW.